United States Patent [19]
Sausa

[11] Patent Number: 6,160,255
[45] Date of Patent: Dec. 12, 2000

[54] LASER-BASED PHOTOACOUSTIC SENSOR AND METHOD FOR TRACE DETECTION AND DIFFERENTIANTION OF ATMOSPHERIC NO AND $NO_2$

[75] Inventor: Rosario C. Sausa, Bel Air, Md.

[73] Assignee: The United States of America as represented by the Secretary of the Army, Washington, D.C.

[21] Appl. No.: 09/168,340

[22] Filed: Oct. 5, 1998

[51] Int. Cl.[7] ..................................................... G02B 6/26
[52] U.S. Cl. ................................ 250/227.24; 250/338.5; 436/159; 340/632
[58] Field of Search ........................... 250/227.14, 338.5, 250/339.12, 573, 227.25, 227.24, 227.23, 339.13, 341.1; 436/159, 164; 340/632, 633; 356/437

[56] References Cited

U.S. PATENT DOCUMENTS 3,553,461 1/1971 Siano ....................................... 436/159

OTHER PUBLICATIONS

Temperature Dependent Quenching of the $A^2\Sigma+$ and $B^2\|$ States of NO, George A. Raiche and David R. Crosley,J. Chem. Phys 92(9), May 1, 1990, pp. 5211–5217.

Detection of Ambient NO by Laser–Induced Photoacoustic Spectrometry Using $A^2\Sigma+$ and $-X^2\|(0,0)$ Transistions Near 226nm, C.K. Williamson, *R.L. Pastel, and R.C. Sausa, vol. 50, Num 2, 1996, Applied Spectrometry, pp. 205–210 (Month Unknown).

Trace Analysis of $NO_2$ in the Presence of NO by Laser Photofragmentation Fragment Photoionization Spectrometry at Visible Wavelengths, J.B. Simeonsson and R.C. Sausa, vol. 50, Num 10, 1996, Applied Spectroscopy, pp. 1277–1282.

A Study of Measurement Interference in the Optoacoustic Detection of $NO_2$ by Argon–Ion Laser Excitation, Alan Fried, vol. 36, Num 5, 1982, Applied Spectrocopy, pp. 562–565. (Month Unknown).

Ozone, NO, and $NO_2$: Oxidant Air Pollutants and More, Jerold A. Last, [1]and Hanspeter Witschi[2], Dec. 1994, pp. 179–184.

Radiative Lifetimes and Electronics Quenching Rate Constants for Single–Photon–Excited Rotational Levels of NO $(A^2\Sigma^+, v^1=0)$, I. Stuart McCermid and James B. Laudenslager, vol. 27, 1982, pp. 483–492. (Month Unknown).

*Primary Examiner*—Que T. Le
*Attorney, Agent, or Firm*—Paul S. Clohan; U. John Biffoni

[57] ABSTRACT

A laser-based photoacoustic sensor performs trace detection and differentiation of atmospheric NO and $NO_2$ in order to obtain respective concentrations for NO and $NO_2$ using photoacoustic spectroscopy. The device of the invention employs a single, pulsed laser having two outputs near 454 nm and 227 nm, respectively, to irradiate a sample vapor, the sample vapor being collected by a hand-held wand. A photoacoustic response from both NO and $NO_2$ is detected using microphone detectors, is converted into electrical signals, and is analyzed using a microcomputer. The results of the analysis—the respective concentrations of NO and $NO_2$ in the sample vapor—are displayed on a digital oscilloscope. Preferably, the electrical signals are amplified prior to analysis, and a boxcar integrator is used to sample and average the electrical signals during the analysis operation.

24 Claims, 6 Drawing Sheets

LASER-BASED PHOTOACOUSTIC SENSOR AND METHOD FOR TRACE DETECTION AND DIFFERENTIANTION OF ATMOSPHERIC NO AND $NO_2$

BACKGROUND OF THE INVENTION

1 Field of the Invention

The present invention generally relates to a laser-based photoacoustic sensor for trace detection and differentiation of atmospheric NO and $NO_2$. More particularly, the invention relates to a device and method for detecting NOx in real-time and in-situ, in which a photoacousitc sensor employs a tunable laser for continuously measuring and differentiating atmospheric concentrations of nitric oxide (NO) and nitrogen dioxide ($NO_2$)

2 Description of the Prior Art

There is a growing interest in laser-based analytical techniques for remote or in-situ trace detection of NO and $NO_2$. Much of this interest stems from concerns related to public health and the environment. These compounds play key roles in catalytic ozone destruction, and in acid rain and photochemical smog formation. In particular, NO and $NO_2$ are hazardous pollutants emitted predominantly from motor vehicle exhaust and stationary sources, such as electrical utility generators and industrial boilers. The U.S. Federal Environmental Protection Agency has established a 25-ppm (parts per million) National Ambient Air Quality Standard threshold limit for NO with concentrated exposures not to exceed 100 ppm for fifteen minutes. $NO_2$ is estimated to be thirty times more toxic than NO (see J. A. Last et al., "Ozone NO and $NO_2$ Oxidation and Air Pollutants and More", *Environ. Health Perspect.* 102, Suppl. 10, 179 (1994)).

The detection of NO and $NO_2$ is also important to laser photofragmentation and fragment-detection techniques being developed for the chemical analysis of propellants and explosives because they are generated in the photolysis of many energetic materials. In that regard, see J. B. Simeonsson and R. C. Sausa, "A Critical Review of Laser Photofragmentation/Fragment Detection Techniques for Gas-Phase Chemical Analysis", *Applied Spectroscopy Reviews*, 31 (1&2) p. 1, 1996).

Conventional methods for determining ambient concentrations of NO and $NO_2$ include chemiluminescence and passive collection with subsequent wet chemical analysis. However, these methods are relatively slow (min-hrs), and have problems in discriminating between NO and $NO_2$, particularly at low concentrations.

Laser-based methods for NO and $NO_2$ detection are being implemented more frequently because they offer rapid and real-time monitoring capabilities with excellent sensitivity. These methods include laser-induced fluorescence (LIF), resonance-enhanced multiphoton ionization (REMPI), and laser photoacoustic spectroscopy (PA). For specific examples of LIF and REMPI detection, see the review article by J. B. Simeonsson and R. C. Sausa mentioned above, as well as the references cited therein. For examples of PA detection, see C. Williamson, R. Pastel and R. Sausa, "Detection of Ambient NO by Laser-Induced Photoacoustic Spectroscopy using $A^2\Sigma^+-X^2\Pi$ (0,0) Transitions Near 226 nm", *Applied Spectroscopy*, 50(2)m p. 205, 1996; L. B. Kreyzek, N. D. Kenyon and C. K. N. Patel, *Science*, 177, 347 (1992); and A. Fried, *Appl. Spect.* 36, 562 (1982); and references cited therein. The activity described in the above-mentioned references centers on the detection of either NO or $NO_2$, but not both simultaneously.

The detection and discrimination of NO and $NO_2$ by a single, laser-based apparatus have been important and formidable analytical challenges. Part of the challenge stems from the fact that NO and $NO_2$ absorb in different spectral regions. $NO_2$ absorbs in the visible region, whereas NO absorbs in the ultraviolet region. $NO_2$ predissociates at wavelengths of less than 400 nm, making ionization and LIF detection difficult. Although both NO and $NO_2$ absorb in the infrared region, few lasers can be tuned in the region where both species absorb. In addition, $H_2O$ is a major spectral interferant in the infrared region.

A device and process for detecting and discriminating NO and $NO_2$ were recently reported (J. Simeonsson and R. Sausa, "Trace Analysis of $NO_2$ in the Presence of NO by Laser Photofragmentation/Fragment Photoionization Spectrometry at Visible Wavelengths," applied Spectroscopy, Vol 50, Number 10, 1996). In that device and process, NO and $NO_2$ molecules are differentiated spectrally by using a visible laser and a simple flow cell with miniature electrodes for ion detection. NO is detected by a REMPI process, whereas $NO_2$ is detected by a laser photofragmentation/fragment ionization process. Limits of detection in the low parts per billion range were reported for NO and $NO_2$.

Although these ionization techniques offer high sensitivity under many conditions, there are situations where these techniques are less suitable. In particular, they suffer from collisional quenching and non-resident background ionization at atmospheric pressure because of the multiphoton processes involved and the relatively high laser fluences required.

At present, there is a need for the development of a method and apparatus for the rapid detection and characterization of atmospheric NOx. There is also a need for the development of a method and apparatus for detecting trace vapors of NO and $NO_2$, and for differentiating between the two species.

SUMMARY OF THE INVENTION

The present invention generally relates to a laser-based photoacoustic sensor for trace detection and differentiation of atmospheric NO and $NO_2$. More particularly, the invention relates to a device and method for detecting NOx in real-time and in-situ.

The device of the present invention comprises a photoacoustic sensor which employs a tunable laser for continuously measuring and differentiating atmospheric concentrations of NO and $NO_2$. In particular, the invention utilizes a pulsed laser operating with both visible and ultraviolet radiation near 454 and 227 nm, respectively. The visible radiation is used to detect $NO_2$ by a one-photon absorption photoacoustic process, whereas the ultraviolet radiation is used to excite NO by means of its transitions near 227 nm. The heat subsequently released from excited NO and $NO_2$ is monitored by miniature electret microphones. Rotationally resolved spectra recorded at ambient conditions show that the spectral resolution is sufficiently high to identify the species at 1 atm. For NO, the photoacoustic spectra are fit using a multi-parameter computer simulation based on a Boltzmann distribution. Transition probabilities and rotational energies are used as input parameters. The analytical merits of the technique are evaluated as a function of buffers gas, pressure, laser energy and concentration. Limits of detection (signal-to-noise ratio of 3) in the range of 0.4 to 5.0 ppm are determined for $NO_2$ and NO at 1 atm for a 10-s integration time.

The invention also includes an optical fiber with lens assembly to transmit the output radiation, miniature microphones to detect both NO and $NO_2$ signals, and data acquisition and processing equipment.

In developing the invention, it has been found that detection of NO and $NO_2$ by laser photoacoustic spectroscopy (PA) techniques can circumvent some of the problems mentioned above associated with use of the LIF and REMPI techniques. The PA technique is primarily calorimetric in nature, and is based on conversion of photo energy to acoustic energy by collisional quenching of the laser excited species. The quenching results in a local temperature increase, followed by a rise in pressure which generates the photoacoustic signal. PA spectrometry is, thus, complementary to the LIF and REMPI techniques because the mechanism involves a process which is competitive with fluorescence and ionization techniques. Higher diluent gas pressures increase the rate of collisional deactivation and improve performance. Unlike REMPI, the PA technique does not require large intensities, and has the benefit of remote detection through the implementation of a tube between the detector and the sample or system of interest. For REMPI detection, the electrodes must be in contact with the sample and in proximity to the laser beam. The PA transducer (e.g., electret microphone) is also compact, simple to implement, and significantly inexpensive compared with the high voltage sources necessary for the REMPI and LIF techniques, as well as the photomultiplier/monochromator required for the LIF technique.

NO and $NO_2$ are suitable molecules for PA detection in the ultraviolet (UV) and visible regions, respectively. First, NO possesses a relatively strong absorption coefficient at 227 nm, and $NO_2$ possesses a relatively strong absorption coefficient at 454 nm. Second, the energy released during collisional deactivation is greater in the UV and visible regions than in the infrared (IR) region on a per photon basis. Third, there is a minimal spectral interference from $H_2O$ and other pollutants near 227 nm or 454 nm compared to 1890 $cm^{-1}$, where NO absorbs in the infrared region. Experimental precautions must be taken in the UV or visible regions, however, since the PA signal intensity can be reduced due to competing fluorescence and ionization processes.

As stated above, the present invention generally relates to a laser-based photoacoustic sensor for trace detection and differentiation of atmospheric NO and $NO_2$. In particular, the invention relates to a sensor and related method which permit rapid detection of NO and $NO_2$, as well as their discrimination, in real-time and in-situ.

Preferably, the sensor of the present invention is rugged, accurate and reliable, and has a fast response time. The sensor comprises a miniature laser operating at 227 nm and 454 nm, and operating in combination with a distributed optical fiber network, miniature microphones, a lens assembly, a current amplifier, a boxcar averager, a digital oscilloscope, and a microcomputer for data acquisition and analysis.

Central to the invention is the use of a single laser operating at two different frequencies, one near 227 nm and the other near 454 nm. Radiation is directed into a fused silica fiber which is coupled to a hand-held wand containing miniature microphones and data acquisition and control equipment. The visible laser radiation is used to excite vapors of $NO_2$, whereas the ultraviolet laser radiation is used to excite vapors of NO. The heat dissipated by the excited species as a result of collisional deactivation results in generation of a pressure wave which is monitored by the microphones. Differentiation between NO and $NO_2$ is achieved by measuring their characteristic photoacoustic spectra near 227 nm and 454 nm, respectively.

Therefore, it is primary object of the present invention to provide a laser-based photoacoustic sensor for trace detection and differentiation of atmospheric NO and $NO_2$.

It is an additional object of the present invention to provide a method and apparatus for detecting trace vapors of NO and $NO_2$, and for differentiating between the two species.

It is an additional object of the present invention to provide a method and apparatus based on photoacoustic spectrometry in which NO and $NO_2$ are measured simultaneously and in real-time using a single laser operating at both 227 nm and 454 nm.

The above and other objects, and the nature of the invention, will be more clearly understood by reference to the following detailed description, the associated drawings, and the appended claims.

DETAILED DESCRIPTION OF THE INVENTION

The invention will now be described in more detail with reference to the various figures of the drawings.

Figure 1:
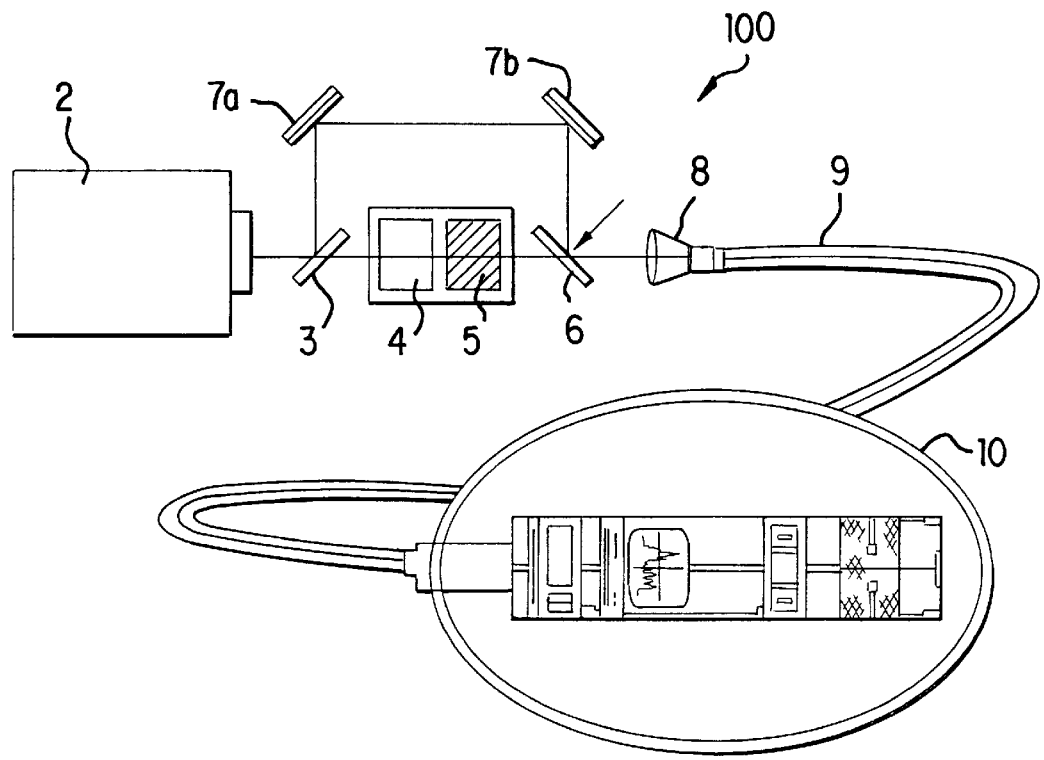
FIG. 1 is a diagrammatic representation of the photoacoustic sensor and analyzer of the present invention.

FIG. 1 is a diagrammatic representation of the photoacoustic sensor and analyzer of the present invention. As seen therein, the sensor/analyzer 100 of the present invention basically comprises the following elements: a pulsed, tunable laser 2; a partially transmitting mirror 3; a doubling crystal 4; a wavelength compensator 5; an optically coated mirror 6; totally reflecting mirrors 7a and 7b; lens assembly 8; optical fiber 9; and hand-held wand 10.

In operation, the pulsed, tunable laser 2 operates near 454 nm and is used for sample interrogation. An optical parametric oscillator or frequency Tiisapphire laser can be used in place of the tunable laser 2.

The 454 nm output is directed to partially transmitting mirror 3, which transmits part of the beam to doubling crystal 4 and wavelength compensator 5. After passage through doubling crystal 4 and wavelength compensator 5, the resulting beam has a wavelength of 227 nm.

The remainder of the 454 nm laser beam is directed by partially transmitting mirror 3 and totally reflecting mirrors 7a and 7b to optically coated mirror 6. Mirror 6 transmits the 227 nm beam, while reflecting the 454 nm beam. The output from optically coated mirror 6 is a laser beam with wavelengths near 454 and 227 nm.

If partially transmitting mirror 3 is removed from this arrangement, then the output laser beam has a wavelength of 227 nm and, if mirror 3 is replaced by a total reflector, similar to mirrors 7a and 7b, then the output is 454 nm. Thus, depending on the optical configuration, wavelengths near 227 nm and/or 454 nm are generated.

The optically coated mirror 6, which acts as a laser beam exiting mirror, is focused onto lens assembly 8, and lens assembly 8 collimates the beam into one end of optical fiber 9. Optical fiber 9 is connected to hand-held wand 10, which houses the data acquisition and analysis components.

Figure 2:
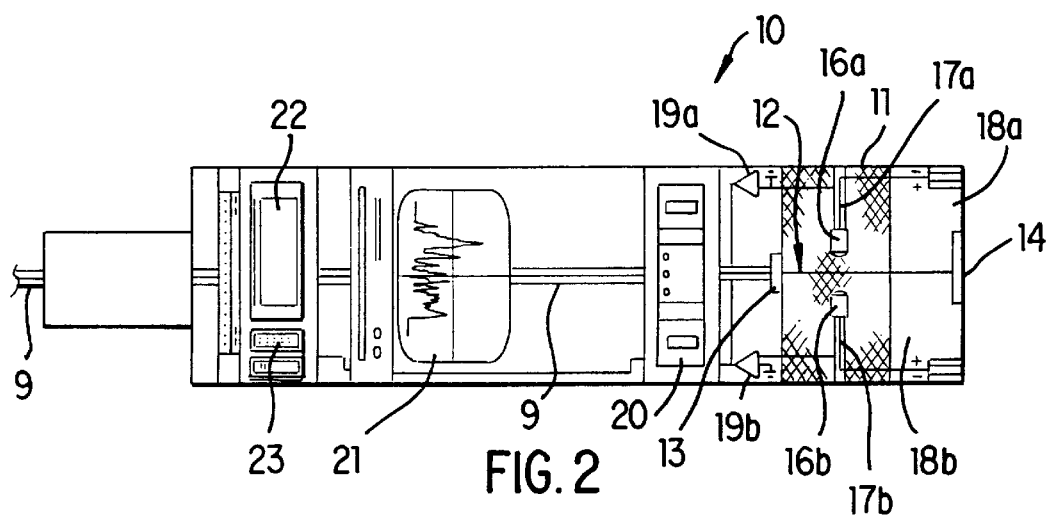
FIG. 2 is a more detailed diagrammatic representation of the wand employed in the sensor of FIG. 1.

FIG. 2 is a more detailed diagrammatic representation of the wand employed in the sensor of FIG. 1. As seen in FIG. 2, hand-held wand 10 comprises the following components: metal screen 11; analysis region 12; collimating lens assembly 13; beam block 14; cylindrically housed microphones 16a and 16b; rods 17a and 17b connected to the cylindrical housings of microphones 16a and 16b, respectively; batteries 18a and 18b; amplifiers 19a and 19b; box integrator 20; digital oscilloscope 21; microcomputer 22; and infrared computer controller 23.

In operation, as the wand 10 is waved through potentially contaminated air, trace quantities of NO and $NO_2$ are swept through metal screen 11 into analysis region 12. In region 12, the sample is irradiated with radiation near 227 and 454 nm emerging from collimating lens assembly 13, the collimating lens assembly 13 receiving the radiation via optical fiber 9 from sensor/analyzer 100, as previously described.

The visible radiation is used to excite $NO_2$ by means of $\tilde{A}'^2B_1(0,8,0)-X^2A_1$ (0,0,0) transitions near 454 nm, whereas the ultraviolet radiation is used to excite NO by means of its $A^2\Sigma^+-X^2\Pi$ (0,0) transitions near 227 nm. The portion of the laser beam which is not absorbed by the sample is transmitted and captured by beam block 14. The notations A and B refer to the A and B excited electronic states of NO, whereas X refers to the ground electronic state of NO.

Dielectric breakdown or photodecomposition of the analytes, particularly $NO_2$, is avoided by using relatively low laser fluxes in laser 2 of FIG. 1. Both of these processes decrease the sensitivity of the apparatus by decreasing the signal-to-noise ratio. The heat released from excited species is monitored by miniature electret microphones 16a and 16b encased in small cylinders (preferably, 9 mm in diameter and 6 mm in length) mounted to rods 17. The microphones 16a and 16b used in this operation, preferably, have an active area of approximately 3 $mm^2$, and exhibit a relatively flat sensitivity response of 65±4 dB in the frequency range of 20–1500 Hz. Other microphones with different configurations can be employed. For example, a tubular microphone which allows the laser beam to be transmitted on its inside wall would certainly enhance the sensitivity of the apparatus because it would capture more of the heat released by the excited analyte.

In the preferred embodiment shown in FIGS. 1 and 2, microphones 16a and 16b are powered by batteries 18a and 18b, respectively (e.g., 9V. batteries). The outputs of microphones 16a and 16b are dropped across capacitors (not shown) and are amplified in transimpedance amplifiers 19a and 19b, respectively.

Amplifiers 19a and 19b convert the ion current to voltage, and the resulting signal is sampled and averaged by boxcar integrator 20, or it is displayed on miniature digital oscilloscope 21. It should be noted that amplifiers 19a and 19b can be implemented by voltage amplifiers rather than current amplifiers without departing from the spirit and scope of this invention. In addition, signal integration could be performed by the digital oscilloscope 21, thus eliminating the boxcar integrator (or averager) 20. Furthermore, a miniature wrist-type computer can be used to implement microcomputer 22 which is interfaced with the oscilloscope 21 and/or the boxcar integrator 20, and such microcomputer 22 is used for data acquisition and analysis. The microcomputer 22 is also interfaced with an infrared computer controlled 23 in order to provide the capability of remote operation of the laser 2 (FIG. 1).

To summarize the operation of the present invention, with reference to FIGS. 1 and 2, the miniature pulsed laser 2 with ultraviolet (~227 nm) and visible (~454 nm) output is used to excite trace quantities of NO and $NO_2$ in the atmosphere. The laser 2 is mounted on a backpack or mobile stand (not shown), and the output beam is directed into one end of optical fiber 9, at which lens assembly 8 is located. Lens assembly 8 and optical fiber 9 transmit the radiation to the hand-held wand 10, which contains (among other elements) analysis region 12 and miniature microphones 16a and 16b. As the wand 10 is waved through the air, the sample vapor is swept through the analysis region where it is bombarded with both visible and ultraviolet radiation. The visible radiation is used to excite $NO_2$ by a one-photon absorption photoacoustic process by means of $\tilde{A}'^2B_1(0,8,0)-X^2A_1(0,0,0)$ transitions near 454 nm, whereas the ultraviolet radiation is used to excite NO by means of its $A^2\Sigma^+-X^2\Pi(0,0)$ transitions near 227 nm. The subsequent heat released from the excited species is monitored by miniature electret microphones 16a, 16b/(preferably, powered by 9V. batteries). The output from the microphone 16a, 16b is amplified in amplifiers 19a, 19b, and is then directed into a boxcar integrator 20 or a digital oscilloscope 21 for real-time display. A microcomputer 22, which is interfaced to the integrator 20 or oscilloscope 21, is used for data acquisition and analysis. A simple and fast computation performed on the signals from the two interrogated frequencies determines the concentration of both NO and $NO_2$. These calculations can be performed by the programmed microprocessor, as will be obvious to those of skill in the art, upon reviewing the remainder of this specification.

Figure 3:
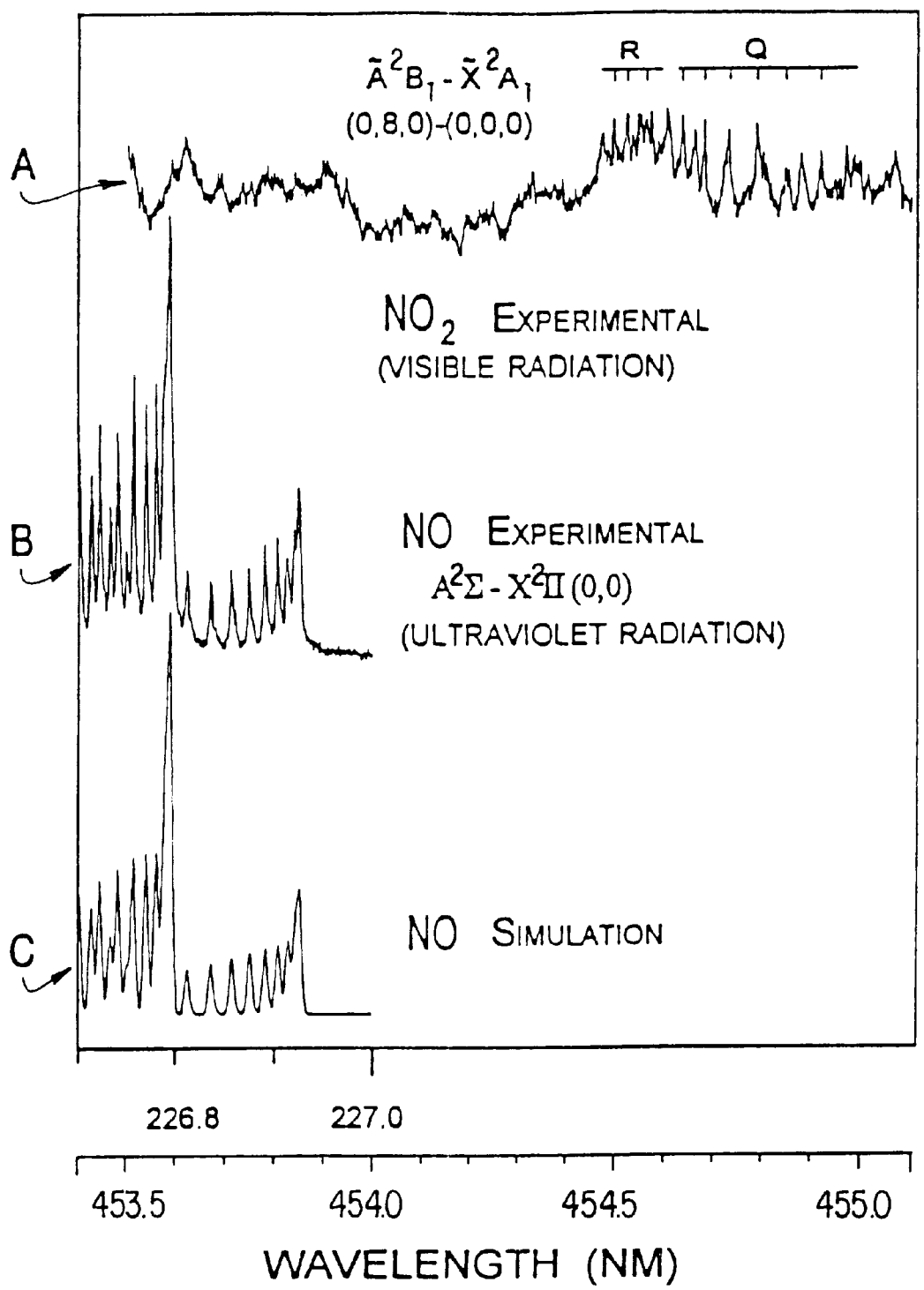
FIG. 3 is a graphical illustration of typical photoacoustic spectra for $NO_2$ and NO, as well as a graphic simulation of the NO spectrum generated by fitting observed data using a multivariable computer program.

FIG. 3 is a graphical illustration of typical photoacoustic spectra for $NO_2$ and NO, as well as a graphic simulation of the NO spectrum generated by fitting observed data using a multivariable computer program. The concentrations of NO and $NO_2$ are approximately 100 ppm in $N_2$ and the total cell pressure is 1 atm. Similar spectra were observed in ambient air. Evident from the waveform B of FIG. 3 are the spectral features due to the $^2\Pi_{1/2}$ and $^2\Pi_{3/2}$ spin-orbit components of the NO ground electric state. The sharp features in the spectrum presented in waveform A of FIG. 3 are assigned to R and Q rotational lines of the $\tilde{A}'^2B_1(0,8,0)-X^2A_1(0,0,0)$ band. Other vibrational bands with higher intensities were observed, but the (0,8,0) band was studied because it is centered at a wavelength which is twice that required to access the NO transitions. The unique features of the spectra and rotational resolution at 1 atmosphere indicate that the PA technique can be highly selective on the base of excitation wavelength for NO and $NO_2$ detection. A PA spectrum of air over the same region shows little, if any, PA signal above the noise.

Presented in waveform C of FIG. 3 is a graphical simulation of the NO spectrum generated by fitting the observed data using a multivariable computer program. The program used over 600 transition probabilities for various rotational levels as input data. The data were generated using spectroscopic constants reported in Herzberg, *Molecular Spectra and Molecular Struture I, Spectra of Diatomic Molecules* (Van Nostrand; Princeton, 1950).

The observed NO signal, $S_{pa}$, is proportional to the energy absorbed over a certain pathlength of the laser beam. Using Beer-Lambert's absorption law and assuming the pathlength to be optically thin, the observed NO signal can be expressed as:

$$S_{pa} = S[E(v_0, l_1) - E(v_0, l_2)] \quad (1)$$

where S is the scaling factor which includes system response and $E(v_0, l)$ is the transmitted laser energy with frequency $v_0$, and traveling a distance l. For a system described by a Boltzmann distribution, $E(v_0, l)$ is given by:

$$E(v_0, l) = \int E_{v,0}(v_0) e^{(-hvl/c)[N_T/Q(T)]\Sigma_j P_j B_j g_j e^{-E_j/kT}} dv \quad (2)$$

where h is Planck's constant; c is the speed of light; $N_t$ is the total population of ground electronic state NO ($X^2\Pi$); Q(T) is the partition function; $g_j$ is the degeneracy of the jth sublevel and $E_j$ is its energy; k is the Boltzmann constant; T is the temperature; and $P_j$ is the Voight transition lineshape. $E(v_0)$ was evaluated by numerical integration over v. The limits of integration were chosen to include more than 99% of the laser profile.

The NO photoacoustic spectrum is generated by evaluating equation (1) for each datum ($v_0$), and is fit to observed spectrum using a multiparameter, non-linear, weighted least squares fitting routine. Parameters include the laser lineshape, Doppler and collisional broadening, the number density, temperature, absolute frequency values, relative frequency values for the data, and parameters associated with experimental conditions. The standard deviation of each parameter, as statistically determined from the fit, is obtained from the computed variance/covariance matrix once convergence is achieved.

A first order model can be used to explain the effect of pressure, buffer gas, laser energy and species concentration on the PA signal. Following the laser pulse, excited NO or $NO_2$ decays either radiatively by spontaneous transition or by collisional quenching with diluents. For a two level electronic system, the rate equation for the decay of excited NO ($A^2\Sigma^+$) or $NO_2^*$, $N^*$, is expressed as:

$$\frac{dN^*}{dt} = -AN^* - kN^*M \quad (3)$$

This equation assumes that all other loss processes, such as those involving energy transfer, ionization and reactions, are negligible. If each collisional quenching of the species generates heat, the rate equation for the heat density, Q can be expressed as:

$$\frac{dQ^*}{dt} = kN^*Mhv \quad (4)$$

Integrating equations (3) and (4) yields the total heat gained:

$$Q = N_0^* hv[kM/(A+kM)] \quad (5)$$

where $N_0^*$ is the initial excited NO or $NO_2$ density following the laser pulse.

For a system at constant value, the change in pressure is proportional to the total heat gained divided by the heat capacity, $\Delta P \sim \Delta T = QV/C_v$, where V is the volume. If we ignore the thermodynamic work, $B\Delta V$, produced in generating the pressure wave, the photoacoustic signal is:

$$S_{pa} \sim \frac{N_0 E \sigma_l}{C_v} [kM/(A+kM)] \quad (6)$$

where we have used Beer-Lambert's Law, $N_g^* = N_g \sigma E/hv$.

As can be seen from the above equation, the photoacoustic signal is proportional to the number density of ground electronic state NO or $NO_2$ and laser energy. The PA signal also depends on the buffer gas pressure and heat capacity of the buffer gas, as well as the k and A rate constants. For kM>>A, the PA signal is independent of pressure and makes it ideal for analytical applications in high pressure environments.

Figure 4A:
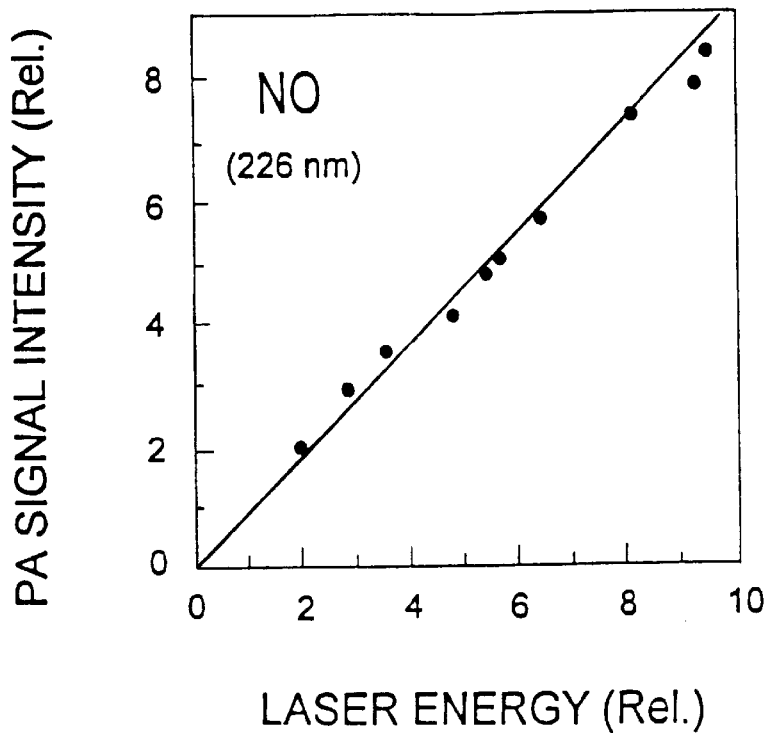
FIGS. 4A and 4B are graphical plots of signal intensity versus laser energy for NO and $NO_2$, respectively.
Figure 4B:
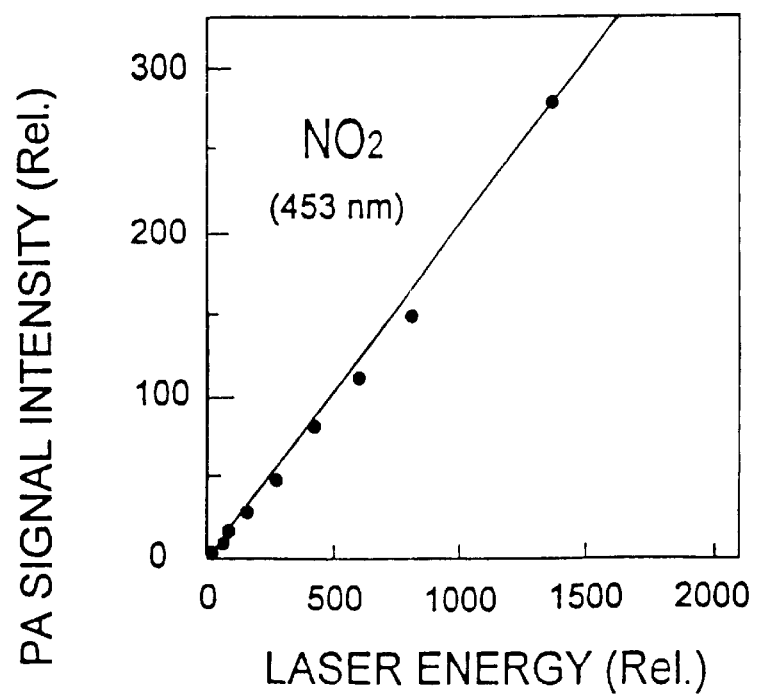

FIGS. 4A and 4B are graphical plots of signal intensity versus laser energy for NO and $NO_2$, respectively. In these figures, the laser energy is not focused. The plots are linear as expected from the model, and are indicative of a one-photon process. The energies employed ranged from approximately 10 to 100 µJ, and were sufficiently low that saturation of the signal was not observed. Focusing the laser beam reduces the NO and $NO_2$ PA signals because of $NO_2$ photodissociation and (1+1) NO REMPI processes. These processes compete favorably with collisional de-excitation, and a reduction in the PA signal is observed.

Figure 5:
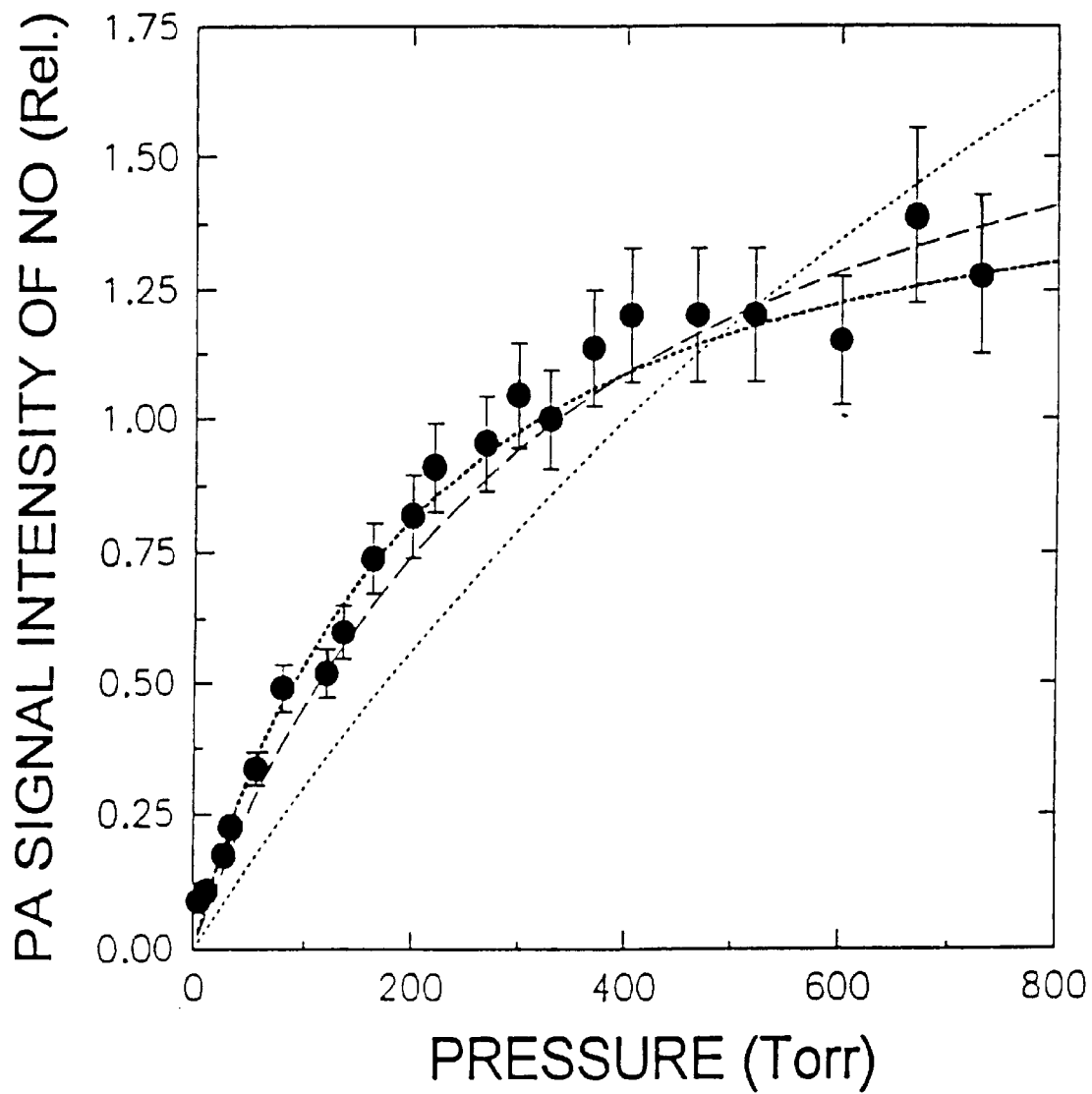
FIG. 5 is a graphical plot of measured signal intensity as a function of Ar pressure.

FIG. 5 is a graphical plot of measured signal intensity as a function of Ar pressure. A similar trend was observed using $N_2$. The various curves shown in FIG. 5 were generated using the equation $S_{pa} = K[kM/(A+kM)]$, were K is a proportionality constant which includes NO concentration, laser energy and system response; k is the NO ($A^2\Sigma^+$) electronic quenching rate; and A is the NO ($A^2\Sigma^+$) spontaneous decay rate. Two of the curves were generated using a value of $A = 4.6 \times 10^6$ sec$^{-1}$, determined from the well-known NO($A^2\Sigma^+$) radiative lifetime (see S. McDermid and J. B. Laudenslager, *J. Quant. Spectrosc. Radiat. Transfer* 27, 483 (1982) and G. A. Raiche and David Crosely, *J. Phys. Chem.* 92, 5211 (1990), and references cited therein), for values of $k_{Ar} = 1.0$ and $3.9 \times 10^{-13}$ cm$^3$/molecule-sec reported by S. McDermid et al. (cited above) and by A. B. Callear in *Appl. Oct. Suppl.* 2, 145 (1965), and for varying K. Both reported values of kar were obtained by LIF using Stern-Volmer analyses. As can be seen from FIG. 5, the curve generated using $k_{Ar} = 3.9 \times 10^{-13}$ cm$^3$/molecule-sec agrees with our data reasonably well. The best fit to the data which is given by the solid curve yields $k_{Ar} = 6.9 \pm 1.0 \times 10^{-13}$ cm$^3$/molecule-sec and K=1.6. Although the PA technique has been used for measuring vibrational relaxation rates, it has not been routinely implemented for determining electronic quenching rates. As an alternative to LIF, the technique may be potentially useful for measuring electronic quenching rates, particularly for species which are weak fluorophores. However, the radiative lifetime of the species must be measured or calculated.

Figure 6:
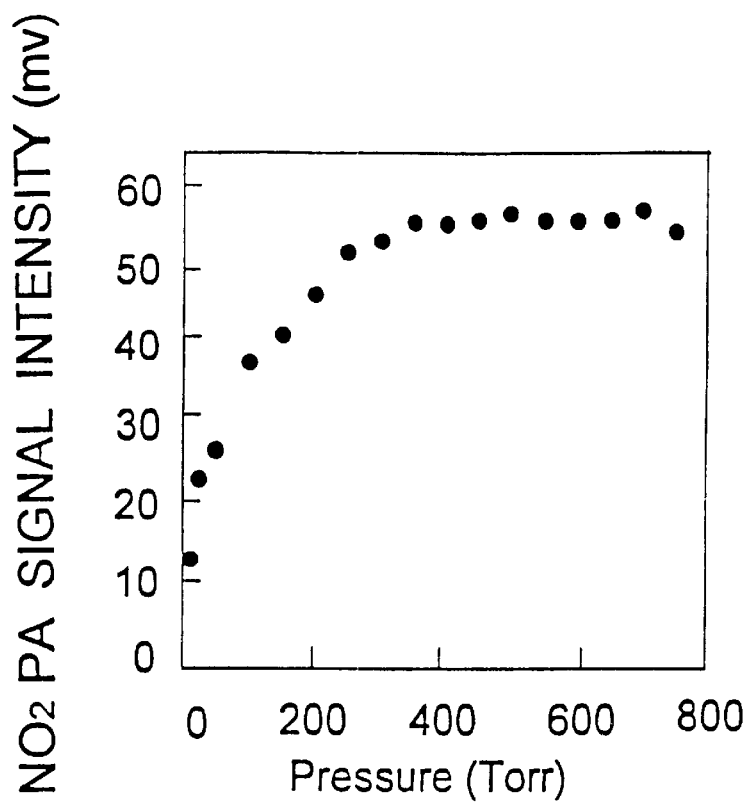
FIG. 6 is a graphical plot showing the $N_2$ buffer gas pressure dependence on an $NO_2$ photoacoustic signal at a fixed $NO_2$ density.

FIG. 6 is a graphical plot showing the $N_2$ buffer gas pressure dependence on an $NO_2$ photoacoustic signal at a fixed $NO_2$ density. The $NO_2$ PA signal increases until it is near 400 torr, and then levels off. As discussed previously, the PA signal is proportional to kM/(A+kM), and a leveling off occurs when the radiationless quenching rate kM is greater than the radiation rate A.

Figure 7:
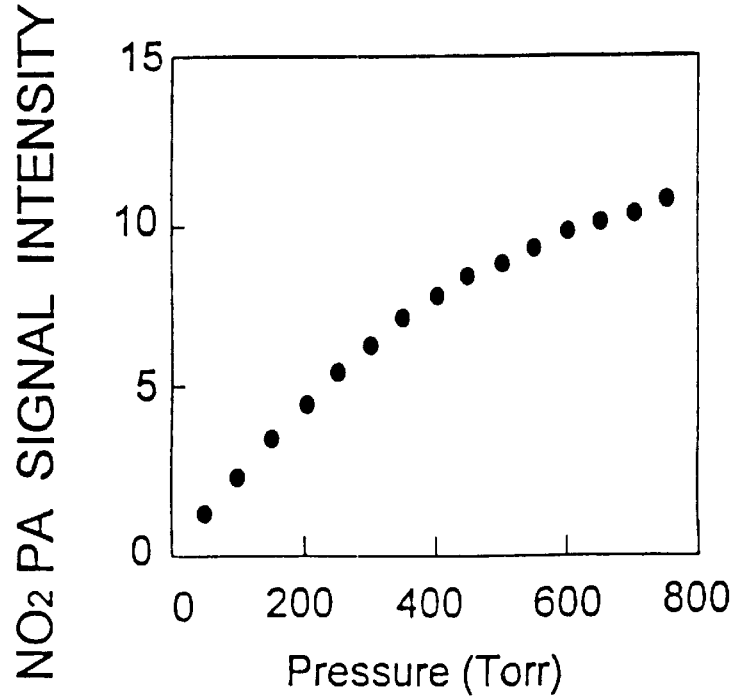
FIG. 7 is a graphical plot showing the photoacoustic signal dependence on pressure for 147 ppm of $NO_2$.

FIG. 7 is a graphical plot showing the photoacoustic signal dependence on pressure for 147 ppm of $NO_2$. As the density of $NO_2$ is increasing with pressure, the plot of FIG. 7 represents the combined pressure and density effects. The $NO_2$ PA signal has a 0.7 power dependence with pressure. This tendency to saturate is due to the pressure saturation observed in FIG. 6.

Figure 8:
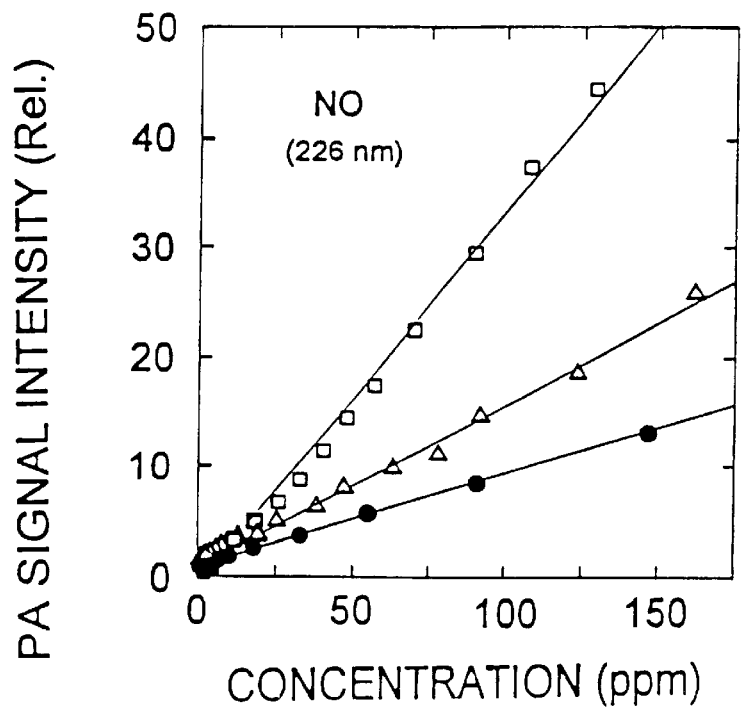
FIG. 8 is a sensitivity plot for NO in 1 atm of Ar, $N_2$ and air using a laser radiation near 227 nm.

FIG. 8 is a sensitivity plot for NO in 1 atm of Ar, $N_2$ and air using a laser radiation near 227 nm. The plots are linear for the shown concentration. Not shown is a leveling off of the signal at concentrations greater than 350 ppm. At these concentrations, NO strongly absorbs the laser energy and the PA signal saturates. The slope of the plot in the linear region yields a sensitivity value for Ar of 0.343 mV/ppm. Using a background noise of 0.398 mV yields a value of 1.2 ppm for the LOD, defined as the concentration that produces a signal equaling three times the standard deviation of the noise. The background noise was evaluated in the absence of NO from twenty independent measurements, each being the average of 10 laser pulses, and was found to be independent of buffer gas. Absorption of radiation by the windows and scattered light contacting the microphones 16a, 16b (FIG. 2) contributed to most of the noise. Measurements using $N_2$ and air as diluents produced LODs of 2.8 and 4.9, respectively.

The higher LOD values in $N_2$ and air compared to Ar are due to the decrease in signal intensities since the noise levels are approximately the same for all three diluent gases. As expected, the signal of NO in $N_2$ at 1 atm is less than Ar since $N_2$ has a smaller heat capacity and quenching rate constant. Quantitatively, the $(S_{Ar}/S_{N2})_{1 atm}$ ratio of 2.3 determined from the experimental values agrees reasonably well with the value of 3.7, calculated using equation (6) above with reported $k_{Ar}$ and $k_{N2}$ values of $3.9\times10^{-13}$ and $9.1\times10^{-14}$ $cm^3$/molecule-sec, respectively, as reported by S. McDermid et al. (as cited above). For air, one would predict a priori that the signal level of NO would be larger than in $N_2$, given that their heat capacities are approximately equal and that $k_{air}$ is greater than $k_{N2}$ because of the contribution of $k_{O2}$, $1.41\times10^{-13}$ $cm^3$/molecule-sec (see the above mentioned reference). However, the reverse is true. Possible explanations as to why the observed NO signal is smaller in air than in $N_2$ are as follows: (1) reaction of NO ($X^2\Pi$) with $O_2$; (2) energy transfer between NO ($A^2\Sigma^+$) and $O_2$; and (3) reaction of NO ($A^2\Sigma^+$) with $O_2$. The first explanation is ruled out since the oxidation of NO by $O_2$ by the slow, third-order reaction $2NO+O_2=2NO_2$, $k=2\times10^{-38}$ $cm^6$/molecule$^2$-sec, is negligible given the concentrations used in this study (<150 ppm). The presence of $O_2$ affecting the energy transfer of the analyte was reported by Fried in *Appi. Spect.* 36, 562 (1982). Fried observed a 34.5% decrease in $NO_2$ signal when $N_2$ was replaced with $O_2$. A modulation frequency of 250 Hz was used in his experiments; thus, the energy released by the $^1\Delta_g$ state of $O_2$ (collisional relaxation time of 23 msec at 600 Torr) was effectively trapped or lost. In the case of interest here, the energy transfer process could involve $O_2(B^3\Sigma_u\alpha^-)$. However, this mechanism seems unlikely, given the energy difference of approximately 5,100 $cm^4$ between the NO (A-X) (0,0) band and the $O_2$ (B-X) Schuman-Runge band centered at 49,363 $cm^{-1}$. Thus, the plausible mechanism involving reactions of NO ($A^2\Sigma^+$) with $O_2$ is favored. Verification of this mechanism requires experimental and theoretical reaction kinetic studies.

Figure 9:
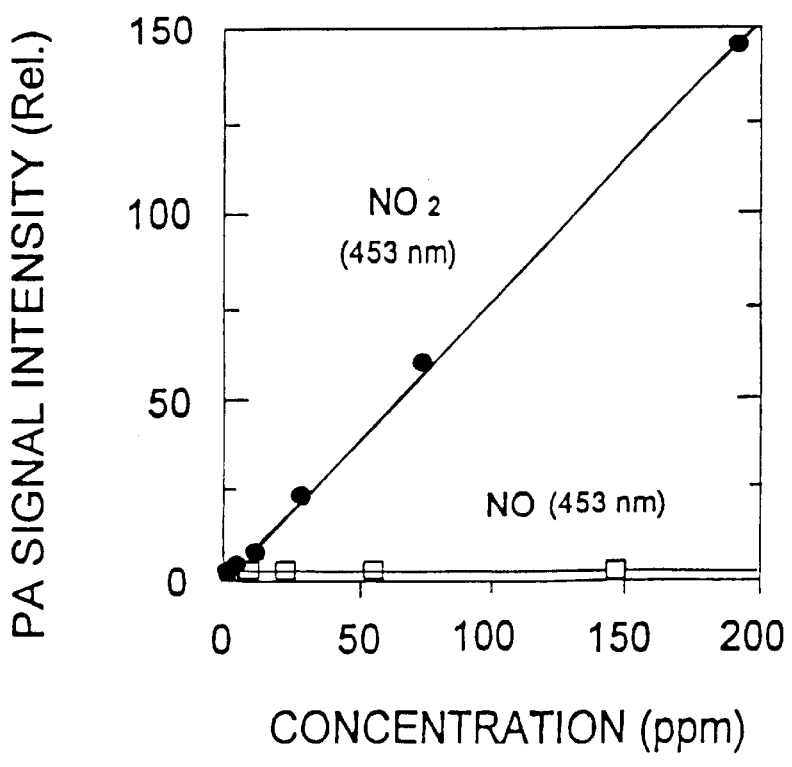
FIG. 9 shows sensitivity plots of NO and $NO_2$ photoacoustic signals at 453.86 nm in 1 atm of $N_2$.

FIG. 9 shows sensitivity plots of NO and $NO_2$ photoacoustic signals at 453.86 nm in 1 atm of $N_2$. The $NO_2$ PA signal is linear over three decades, and yields a limit of detection (S/N=3) of 400 ppb. Using a laser wavelength of 454.35 nm yields a similar limit of detection. The NO PA response at both wavelengths is negligible because its absorption coefficient is very small at this wavelength. The $NO_2$ PA LOD would be approximately 7% less in air compared with $N_2$ because of an energy transfer process involving electronically excited $NO_2$ and $O_2$.

The instrument performance of the present invention can be improved to enhance NO and $NO_2$ PA sensitivities by using higher laser energies and using cylindrical microphones having built-in preamplifiers, as well as different excitation schemes. For $NO_2$, an increased PA sensitivity can be achieved by using the P and Q transitions near 454.7 nm or other vibrational bands that are more intense than the (0,8,0) band. A reduction in noise also results in lower NO and $NO_2$ LODs.

While preferred forms and arrangements have been shown in illustrating the invention, it is to be understood that various changes and modifications may be made without departing from the spirit and scope of this disclosure.

What is claimed is:

1. A device for detecting and differentiating atmospheric concentrations of a first substance and a second substance, comprising:

laser means for generating radiation;

optical fiber means connected to said laser means for transmitting the radiation; and wand means connected to said optical fiber means for receiving said radiation, said wand means also receiving a sample vapor which includes concentrations of said first and second substances, and said wand means subjecting said sample vapor to said radiation so as to excite said first and second substances and to release heat therefrom;

wherein said wand means includes an analysis section for monitoring and analyzing said heat released from said first and second substances so as to determine the respective concentrations of said first and second substances.

2. The device of claim 1, wherein said optical fiber means includes a lens assembly.

3. The device of claim 1, wherein said wand means includes at least one microphone detector for monitoring said heat released from said excited substances.

4. The device of claim 1, wherein said wand means includes an analysis region for receiving said sample vapor.

5. The device of claim 1, wherein said analysis section of said wand means includes at least one detector for detecting said heat released from said excited substances and for producing corresponding electrical signals, and at least one amplifier for amplifying said electrical signals.

6. The device of claim 5, wherein said analysis section further comprises an integrator circuit connected to said at least one amplifier for sampling and averaging said electrical signals.

7. The device of claim 6, wherein said analysis section further comprises a digital oscilloscope connected to said integrator circuit for displaying signals corresponding to said concentrations of said first and second substances, respectively.

8. The device of claim 7, wherein said analysis section further comprises a microcomputer connected to at least one of said integrator circuit and said digital oscilloscope.

9. The device of claim 1, wherein said laser means comprises a single, pulsed laser having two outputs, each said output being near a respective one of two distinct wavelengths.

10. The device of claim 9, wherein said single, pulsed laser has outputs near 454 nm and 227 nm, respectively, and irradiates said sample vapor by means of the $NO_2$ $\tilde{A}'^2B_1(0,8,)-X^2A_1(0,0,0)$ transition near 454 nm, and by means of the $NOA^2\Sigma^+-X^2\Pi(0,0)$ transition near 227 nm, where (0,8,0) is the excited vibrational state of $NO_2$, $\tilde{A}'^2B_1$ is the excited electronic state of $NO_2$, (0,0,0) is the ground vibrational state of $NO_2$, and $\tilde{X}^2A_1$ is the ground electronic state of $NO_2$. $A^2\Sigma^+$ is the excited electronic state of NO, $X^2\Pi$ is the electronic ground state of NO, and the notation (0,0)

refers to the vibrational levels of the excited and ground electronic states of NO, respectively.

11. The device of claim 10, wherein said wavelengths correspond to NO A-X($x_j$,$y_j$) transitions, where A is the NO(A) excited electronic state, X is the NO(X) ground electronic state, $x_j$ is the jth rotational level of the vibrational level of the xth NO(A) electronic state, and $y_j$ is the jth rotational level of the vibrational level of the NO(X) ground electronic state.

12. The device of claim 10, wherein said wavelengths correspond to $NO_2$($x_i$,$y_j$,$Z_k$) ground electronic state, where $x_i$ is the ith rotational level of the xth vibrational state, $y_j$ is the jth rotational level of the yth vibrational state, and $Z_k$ is the rotational level of the zth vibrational state.

13. The device of claim 10 wherein said wavelengths correspond to NO electronic transitions such as B-X, C-X, D-X, B-X, E-X, a-X, D-A, E-A, B-B, and b-a, where B, C, D, B', E, A, b, and a are the excited electronic states of NO and X is the ground electronic state of NO.

14. The device of claim 1, wherein said wand means employs photoacoustic spectroscopy techniques to determine species electronic quenching rates.

15. A method for detecting and differentiating mixtures of first and second substances in a sample vapor, comprising the steps of:

collecting said sample vapor in a sample region;

irradiating said sample vapor by means of first and second transitions for said first and second substances, respectively, at first and second wavelengths, respectively;

detecting a photoacoustic response from both of said first and second substances so as to form corresponding electrical signals; and analyzing said electrical signals so as to obtain respective concentrations of said first and second substances in said sample vapor.

16. The method of claim 15, wherein said irradiating step comprises irradiating said sample mixture by means of the $NO_2 \tilde{A}'^2B_1(0,8,0)-X^2A_1(0,0,0)$ transition near 454 nm, and by means of the $NO A^2\Sigma^+-X^2\Pi(0,0)$ transition near 227 nm, where (0,8,0) is the excited vibrational state of $NO_2$, $\tilde{A}'^2B_1$ is the excited electronic state of $NO_2$, (0,0,0) is the ground Vibrational state of $NO_2$, and $\tilde{X}^2A_1$ is the ground electronic state of $NO_2$. $A^2\Sigma^+$ is the excited electronic state of NO, $X^2\Pi$ is the electronic ground state of NO, and the notation (0,0) refers to the vibrational levels of the excited and ground electronic states of NO, respectively.

17. The method of claim 15, wherein said detecting step is carried out by a plurality of microphone detectors.

18. The method of claim 15, further comprising the step, prior to said analyzing step, of amplifying the electrical signals obtained during said detecting step.

19. The method of claim 15, wherein said analyzing step comprises integrating said electrical signals so as to sample and average said electrical signals.

20. The method of claim 15, further comprising the step, after said analyzing step, of displaying the respective concentrations of said first and second substances in said sample vapor.

21. The method of claim 15, wherein said wavelengths correspond to NO A-X($x_j$,$y_j$) transitions, where A is the NO(A) excited electronic state, X is the NO(X) ground electronic state, $x_j$ is the jth rotational level of the xth vibrational level of the NO(A) electronic state, and $y_j$ is the jth rotational level of the yth vibrational level of the NO(X) ground electronic state.

22. The method of claim 15, wherein said wavelengths correspond to $NO_2$($x_i$,$y_j$,$z_k$) ground electronic state, where $x_i$ is the ith rotational level of the xth vibrational state, $y_j$ is the jth rotational level of the yth vibrational state, and $z_k$ is the kth rotational level of the zth vibrational state.

23. The method of claim 15, wherein said wavelengths correspond to NO electronic transitions such as B-X, C-X, D-X, B-X, E-X, a-X, D-A, E-A, B-B, and b-a, where B, C, D, B', E, A, b, and a are the excited electronic states of NO and X is the ground electronic state of NO.

24. The method of claim 15, wherein photoacoustic spectroscopy is used to determine species electronic quenching rates.

* * * * *